US005494549A

United States Patent [19]

Oki et al.

[11] Patent Number: 5,494,549

[45] Date of Patent: Feb. 27, 1996

[54] DICING METHOD

[75] Inventors: Tetsuro Oki; Yoshio Murakami; Tsuyoshi Miyata, all of Kyoto, Japan

[73] Assignee: Rohm Co., Ltd., Japan

[21] Appl. No.: 131,960

[22] Filed: Oct. 8, 1993

[30] Foreign Application Priority Data

| | | | |
|---|---|---|---|
| Oct. 8, 1992 | [JP] | Japan | 4-270308 |
| Oct. 19, 1992 | [JP] | Japan | 4-280145 |
| Oct. 19, 1992 | [JP] | Japan | 4-280146 |

[51] Int. Cl.$^{6}$ .......... B32B 31/18

[52] U.S. Cl. .......... 156/268; 437/226; 437/925

[58] Field of Search .......... 156/268; 29/412, 29/559; 83/648, 861, 906, 953; 125/35; 437/226, 925

[56] References Cited

U.S. PATENT DOCUMENTS

| | | | |
|---|---|---|---|
| 3,850,721 | 11/1974 | Schubert | 29/559 X |
| 3,970,494 | 7/1976 | Pritchard | 437/226 |
| 4,138,304 | 2/1979 | Gantley | 156/268 |
| 4,711,014 | 12/1987 | Althouse | 29/412 |
| 4,720,317 | 1/1988 | Kuroda et al. | 156/268 X |
| 4,793,883 | 12/1988 | Sheyon et al. | 156/268 X |
| 4,961,804 | 10/1990 | Aurichio | 156/268 X |
| 5,238,876 | 8/1993 | Takeuchi et al. . | |
| 5,362,681 | 11/1994 | Roberts, Jr. et al. | 437/226 |

FOREIGN PATENT DOCUMENTS

| | | | |
|---|---|---|---|
| 0206628 | 12/1986 | European Pat. Off. | 437/226 |
| 52-95164 | 8/1977 | Japan . | |
| 52-96863 | 8/1977 | Japan . | |
| 55-43853 | 3/1980 | Japan | 437/226 |
| 55-53438 | 4/1980 | Japan | 29/412 |
| 55-78544 | 6/1980 | Japan . | |
| 56-87341 | 7/1981 | Japan | 29/559 |
| 58-100443 | 6/1983 | Japan | 437/226 |
| 61-168935 | 7/1986 | Japan | 437/226 |
| 61-210650 | 9/1986 | Japan | 437/226 |
| 1-51911 | 2/1989 | Japan | 125/35 |
| 1-313957 | 12/1989 | Japan . | |
| 3-286553 | 12/1991 | Japan . | |

OTHER PUBLICATIONS

Japanese Utility Model Laid–Open Publication, Sho 57–200033, Jun. 1956, pp. 323–332.

*Primary Examiner*—David A. Simmons
*Assistant Examiner*—M. Curtis Mayes
*Attorney, Agent, or Firm*—Fish & Richardson

[57] ABSTRACT

In a dicing method, a resin adhesive tape is stuck to one surface of a wafer mount frame, then a rubber plate is stuck to the tape from the open side of the frame. With the rubber plate stretched, an adhesive is sprayed over the rubber plate, whereupon a wafer is stuck to the rubber plate. A weight is placed on the rubber plate to extend it further, thus fixing the wafer to the frame. The thus mounted wafer is diced. Alternatively, a resin adhesive tape is stuck to one surface of the frame, then a thick adhesive rubber plate is stuck to the tape from the open side of the frame, whereupon a wafer with hard wax printed using a screen mask is stuck to the rubber plate. The thus mounted wafer is diced by cutting into it deeply. The cut wafer is soaked in a solvent for separation from the rubber plate. As a further alternative, screen mask printing is carried out on a wafer, and wax is coated over the wafer. A resin adhesive tape is stuck to one surface of a wafer mount frame, and then a thick adhesive rubber plate is stuck to the tape from the open side of the wafer mount frame, whereupon the wax-side surface of the wafer is stuck to the rubber plate. The mounted wafer is diced. The wafer is soaked in a solvent for separation of chips from the rubber plate.

4 Claims, 3 Drawing Sheets

DICING METHOD

BACKGROUND OF THE INVENTION

1. Field of the Invention

This invention related to a method of dicing a workpiece of hard material, and more particularly to a method of mounting the workpiece in such a manner that chipping cracks and fins will be reduced during dicing. The invention also relates to a method of separating chips easily from an elastic fixing means after dicing.

2. Description of the Related Art

Conventionally, in the semiconductor industry, dicing takes place to cut chips off a wafer on which a large number of integrated circuits are formed. The conventional dicing method will now be described with reference to FIGS. 7 through 9 of the accompanying drawings.

FIG. 7 is a schematic vertical cross-sectional view of a wafer mounted ready to be diced. The mounted wafer 2 comprises a wafer mount frame 3, and a resin adhesive tape 4 for fixing the wafer 2 to the wafer mount frame 3. The wafer mount frame 3 has a large opening larger in diameter than the wafer 2. The resin adhesive tape 4 includes a substrate 4*a* of vinyl chloride, and an adhesive layer 4*b* using an acrylic adhesive agent.

The main procedure of mounting the wafer 2 will now be described with reference to FIG. 8.

For mounting the wafer 2, firstly the resin adhesive tape 4 is stuck to one surface of the wafer mount frame 3, having such a size as to back the opening of the wafer mount frame 3. Then the excessive part of resin adhesive tape 4 except the part backing the opening of the wafer mount frame 3 is cut off. After the wafer 2 is placed on a mount table 5 heated at 80° C., the wafer mount frame 3 with the resin-adhesive-tape side facing up is placed on the mount table 5 in such a manner that the wafer 2 is received in the opening of the wafer frame 3. As shown in FIG. 7, the wafer 2 is then fixed to the resin adhesive tape 4 using a rubber roller 6, finalizing the mounting of the wafer 2.

The procedure of cutting the wafer 2 into chips is described as follows.

FIG. 9 is a diagram schematically showing the wafer 2. On the wafer 2, chips 10 are orderly arranged in rows and columns, there being a groove, called a scribe line 11, between adjacent chips. The wafer 2 is cut into the individual chips along the scribe lines 11 using a dicing saw. At that time, as shown in FIG. 9, the wafer 2 is cut in the direction of rows (CH2) and then in the direction of columns (CH1). The extent (depth) of this cutting of the dicing saw is usually 30 to 40 μm.

Thus, the mounted wafer 2 is cut into chips by the dicing saw. The chips stuck to the resin adhesive tape 4 are separated from the adhesive tape 4 by ultrasonic washing.

According to the conventional dicing method, however, stresses due to the dicing saw are exerted directly on the fixed wafer, which would cause chipping cracks in the cut surface of the wafer partly because the adhesion of the resin adhesive tape to fix the wafer is too strong and partly because the resin adhesive tape can escape to only a limited extent to absorb the stresses during the dicing. Since silver, which is used as a metal of the rear surface (cathode surface) of the wafer is malleable and ductile and hence pulls the semiconductor device while the wafer is being cut, it would facilitate not only the occurrence of chipping cracks but also the development of fins on the rear surface. Particularly during the cutting in the direction of columns CH1, since it takes place after the cutting in the direction of rows, stresses would be absorbed by the malleability of the resin adhesive tape so that chipping cracks will hardly occur in the wafer. On the contrary, during the cutting in the direction of rows CH2, since the wafer is fixed too firmly by the resin adhesive tape, chipping cracks are apt to occur.

SUMMARY OF THE INVENTION

With the foregoing problems in mind, an object of this invention is to provide a dicing method in which chipping cracks will hardly occur in the cut surface of a workpiece of hard material when the workpiece is diced.

Another object of the invention is to provide a dicing method in which fins on the rear surface of a workpiece of hard material would hardly occur during dicing.

Still another object of the invention is to provide a dicing method in which occurrences of chipping cracks in the cut surface of a workpiece of hard material during dicing can be reduced and in which chips obtained by cutting the workpiece can be separated from an elastic fixing means without difficulty.

In order to accomplish the first-named object, according to a first aspect of the invention, there is provided a dicing method comprising the steps of: fixing a workpiece of hard material to a workpiece mount frame by a workpiece fixing means; sticking the workpiece to the workpiece mount frame by an elastic fixing means; and dicing the workpiece stuck to the workpiece mount frame.

According to a second aspect of the invention, there is provided a dicing method wherein a workpiece of hard material is fixed to a workpiece mount frame by an elastic fixing means.

Because of the elasticity of the adhesive of the elastic sticking means, it is possible to remarkably reduce occurrences of chipping cracks during cutting.

Specifically, in this dicing method, a resin adhesive tape is stuck to one surface of a wafer mount frame, then a rubber plate is stuck to the tape from the open side of the frame. With the rubber plate extended, an adhesive or gum is sprayed over the rubber plate, whereupon a wafer is stuck to the rubber plate. A weight is placed on the rubber plate to extend it further, thus fixing the wafer to the frame. The thus mounted wafer is diced.

Alternatively, a resin adhesive tape is stuck to one surface of a wafer mount frame, then a thick adhesive rubber plate is stuck to the tape from the open side of the frame, whereupon a wafer with hard wax screen-mask-printed is stuck to the rubber plate. The thus mounted wafer is diced by cutting into it deeply. The cut wafer is soaked in a solvent for separation from the rubber plate.

In another alternative way, screen mask printing is carried out on a wafer, and wax is coated over the wafer. A resin adhesive tape is stuck to one surface of a wafer mount frame, and then a thick adhesive rubber plate is stuck to the tape from the open side of the wafer mount frame, whereupon the wax-side surface of the wafer is stuck to the rubber plate. The thus mounted wafer is diced. The cut wafer is soaked in a solvent for separation of chips from the rubber plate.

Thus, according to this invention, since the workpiece is stuck to the elastic fixing means, namely, since the workpiece escapes in the dicing direction utilizing the malleability and ductility of the elastic fixing means, it is possible to remarkably reduce occurrences of chipping cracks.

In order to accomplish the second-named object, according to a third aspect of the invention, there is provided a method for dicing a workpiece, comprising the steps of: fixing a workpiece of hard material to a workpiece mount frame by an elastic sticking means; and preparing the elastic sticking means so as to have a thickness of at least 0.5 mm; and cutting into the elastic fixing means to an extent of at least 50 μm by a dicing saw.

In the third method, a piece of hard material is placed between the workpiece and the elastic fixing means.

Therefore it is possible to reduce chipping cracks by cutting deeply into the elastic fixing means deeply.

It is also possible to remarkably reduce occurrences of fins by placing a piece of hard material between the workpiece and the elastic fixing means.

Specifically, in this dicing method, the workpiece fixing means is stuck to the workpiece mount frame, and then the elastic fixing means is stuck to the workpiece fixing means from the open side of the workpiece mount frame. The elastic fixing means has a thickness of at least 0.5 mm. An adhesive is previously attached to the elastic fixing means. The workpiece is placed on the mount table, and then the mount frame is placed on the mount table with the workpiece-fixing-means side up over the workpiece, whereupon the workpiece is fixed to the elastic fixing means using the rubber roller. The workpiece is cut in such a manner that the depth to which the dicing saw bites into the elastic fixing means is at least 50 μm.

Since the dicing saw cuts into the elastic fixing means deeply, it is possible to remarkably reduce occurrences of chipping cracks.

In an alternative dicing method, hard material is previously deposited on the rear surface of the workpiece. Then the workpiece fixing means is stuck to the workpiece mount frame, and then the elastic fixing means is stuck to the workpiece fixing means from the open side of the workpiece mount frame. The elastic fixing means has a thickness of at least 0.5 mm. An adhesive has been previously attached to the elastic fixing means. The workpiece is placed on the mount table with the hard-material side facing up, and then the workpiece mount frame is placed on the mount table with the workpiece-fixing-means side up over the workpiece, whereupon the workpiece is fixed to the elastic fixing means using the rubber roller. The workpiece is cut in such a manner that the extent to which the dicing saw bites into the elastic fixing means has been at least 50 μm.

Since the dicing saw bites into the elastic fixing means deeply, it is possible to remarkably reduce the occurrences of chipping cracks. Further, fins can be trimmed off between the dicing saw and the piece of hard material.

In order to accomplish the third-named object, according to a fifth aspect of the invention, there is provided a dicing method comprising the steps of: fixing a workpiece of hard material to a workpiece mount frame by an elastic fixing means; placing a piece of soluble material between the workpiece and the elastic fixing means.

Therefore with this dicing method, it is possible to separate the chips from the elastic fixing means without difficulty.

Specifically, in this dicing method, soluble material is previously printed on the rear surface of the workpiece, and then the workpiece fixing means is stuck to the workpiece mount frame, whereupon the elastic fixing means is stuck to the workpiece fixing means from the open side of the workpiece mount frame. An adhesive is previously attached to the elastic fixing means. The workpiece is placed on the mount table with the soluble-material side facing up, and then the workpiece mount frame is placed on t(he mount table with the workpiece-fixing-means side up over the workpiece, whereupon the workpiece is fixed to the elastic fixing means using the rubber roller. The workpiece is cut into chips, and then the chips with the elastic fixing means are soaked in a solvent.

Thus since the soluble material is dissolved in the solvent, and the individual chips can be separated from the elastic fixing means without difficulty.

DETAILED DESCRIPTION OF THE PREFERRED EMBODIMENTS

Figure 1:
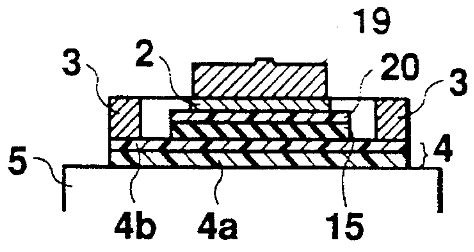
FIG. 1 is a schematic vertical cross-sectional view showing the manner in which a wafer to be diced is mounted according to a first embodiment of this invention.

Various preferred embodiments of this invention will now be described with reference to the accompanying drawings. Parts or elements similar to those of the conventional art are designated by like reference numerals. These parts or elements are illustrated on different scales throughout several views for convenience of explanation.

Figure 2:
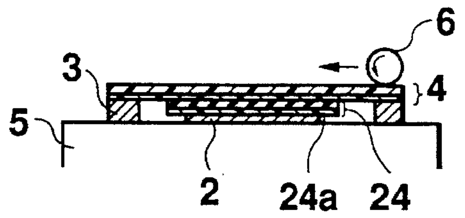
FIG. 2 is a schematic vertical cross-sectional view showing the manner in which a wafer to be diced is mounted according to a second embodiment.
Figure 3:
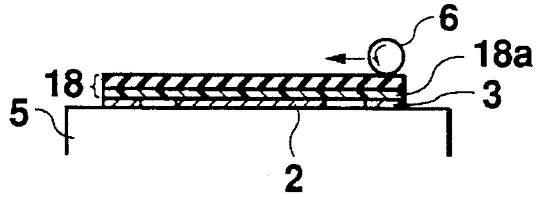
FIG. 3 is a schematic vertical cross-sectional view showing the manner in which a wafer to be diced is mounted according to a third embodiment.

FIGS. 1 through 3 are schematic cross-sectional views each showing the manner in which a wafer to be diced is mounted according to individual embodiments.

For a characteristic feature of this invention, a wafer 2 as a workpiece of hard material is stuck to a rubber plate, which is elastic. The rubber plate reduces stresses exerted on the wafer when the dicing saw is moved during cutting, thereby minimizing cracks in the cut surface of the wafer 2.

FIG. 1 shows a first embodiment, in which the means for fixing a wafer 2 are a resin adhesive tape 4 and a rubber plate 15, which serves as the elastic fixing means of this invention.

The dicing method of the first embodiment is as follows:

Firstly, the resin adhesive tape 4 is stuck to one surface of a wafer mount frame 3 having an opening. The material of the wafer mount frame 3 to be used in this embodiment is stainless steel, and the opening of the wafer mount frame 3 has a diameter of 21 cm. The resin adhesive tape 4 includes a substrate 4_a_ of vinyl chloride having a thickness 118 μm and an adhesive layer 4*b* using an acrylic adhesive and having a thickness of 7 μm. Also the resin adhesive tape 4 has a width large enough to back the opening of the wafer mount frame 3. After the excessive part of the resin adhesive tape 4 except the part backing the opening the wafer mount frame 3 has been trimmed off, the rubber plate 15 is stuck to the resin adhesive tape 4 from the open side of the wafer mount frame 3. Assuming that, when a chip having dimensions of 1 square mm and a thickness of 250 μm is moved at least 1 mm as pushed by a needle tip, the weight of the chip is 1 g, then the adhesion of the rubber plate 15 to be used in this embodiment is at most 50 g, compared with 118 g in the case of the adhesion of the resin adhesive tape according to the conventional art. The rubber plate 15 has a thickness of 0.5 mm. The same parts are used also in the following embodiments. The rubber plate 15 stuck to the resin adhesive tape 4 is stretched flat using a mounter (not shown) heated at 80° C. Then an adhesive or gum 20 is sprayed over the rubber plate 15, and the wafer 2 is stuck to the gum-coated surface of the rubber plate 15. the wafer mount frame 3 is placed on a mount table 5, which is heated at 80° C., with the wafer side up. The wafer 2 is pressed on its upper surface by a weight 19 or the like to stretch the rubber plate 15 further, thereby fixing the wafer 2 to the wafer mount frame 3.

Figure 9:
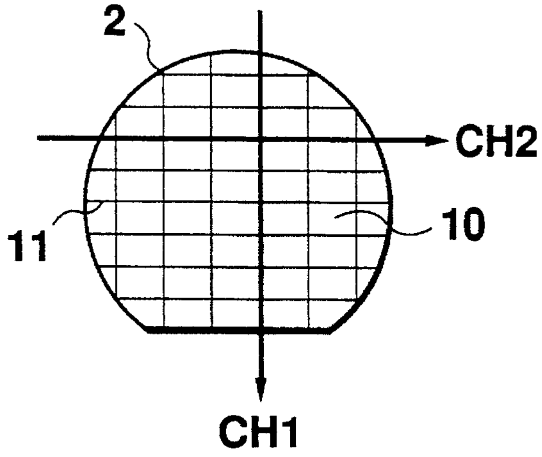
FIG. 9 is a diagrammatic plan view of a wafer.

The wafer 2 mounted as shown in FIG. 1 is cut in the direction of CH2 and then in the direction of CH1 as shown in FIG. 9.

According to this embodiment, by utilizing the elasticity, i.e. the amount of stress absorption, of the rubber plate 15, it is possible to minimize stresses which might be exerted on the wafer 2 due to the movement of a dicing saw 12. Namely it is possible to absorb the stresses which might be exerted on the wafer 2 so that occurrences of cracks in the cut surface of the wafer 2 can be reduced.

The rubber plate 15 is stuck to the resin adhesive tape 4 so as to assume an outwardly pulled posture. Therefore, when the rubber plate 15 together with the wafer 2 is cut by the dicing saw 12, the rubber plate 15 will be pulled in the direction of opening its cut surface. In response to this pulling of the rubber plate 15, the wafer 2 also will be pulled in the direction of opening its cut surface and hence will be divided into chips 10. Therefore, the wafer 2 is free from stresses resulting from the movement of the dicing saw 12 so that cracks will hardly occur in the cut surface of the wafer FIG. 2 shows a second embodiment, in which the elastic fixing means is a rubber plate 24 with an adhesive attached thereto.

In the first embodiment, the wafer 2 is stuck to the rubber plate 15 by the gum 20. Whereas in this embodiment, the rubber plate 24 to which an adhesive 24*a* is already attached thereto is used to stick the wafer 2 to the adhesive surface. Namely, when mounting the wafer 2, the same steps of the first embodiment except the step of spraying the gum 20 are carried out.

The thus mounted wafer 2 is cut in the direction of CH2 and then in the direction of CH1 as shown in FIG. 9.

As mentioned above, according to this embodiment, by utilizing the elasticity, i.e. the amount of absorption, of the rubber plate 24 with the adhesive 24*a* already attached thereto, it is possible to minimize stresses which might be exerted on the wafer 2 due to the movement of the dicing saw 12. The rubber plate 24 will absorb stresses on the wafer 2 so that occurrences of cracks in the cut surface of wafer 2 can be reduced.

Further, by using the adhesive-attached rubber plate 24, it is possible to omit the step of attaching the adhesive to the rubber plate 15, thus reducing the dicing time.

FIG. 3 shows a third embodiment, in which the means for fixing the wafer 2 includes only an adhesive-attached rubber plate 18.

Specifically, using the adhesive-attached rubber plate 18 having a size sufficient to back the opening of a wafer mount frame 3, the wafer mount frame 3 is stuck to the adhesive (18*a*) side of the rubber plate 18. A wafer 2 is placed on a mount table 5 heated at 80° C., and then the wafer mount frame 3 is placed on the mount table 5 with the rubber-plate (18) side up over the wafer 2. The adhesive-attached rubber 18 is stretched by a rubber roller 6 to fix the wafer 2 to the wafer mount frame 3.

The thus mounted wafer 2 is cut in the direction of CH2 and then in the direction of CH1 as shown in FIG. 9.

As mentioned above, according to this embodiment, by utilizing the elasticity, i.e. the amount of absorption, of the adhesive-attached rubber plate 18, it is possible to minimize stresses which might be exerted on the wafer 2 due to the movement of the dicing saw 12. This rubber plate 18 will absorb the stresses on the wafer 2 so that occurrences of chipping cracks in the cut surface of the wafer 2 can be reduced.

Further, by using the adhesive-attached rubber plate 18, it is possible to omit the step of attaching the adhesive to the rubber plate 15 and the step of sticking the resin adhesive tape to the wafer mount frame 3, thus reducing the dicing time.

Table 1 shows the rate of occurrence of horizontal cracks in each of the foregoing embodiments in comparison with the conventional art. These data are values measured when a single wafer 2 was cut in the direction of rows (CH2) five times and then in the direction of columns (CH1) five times and mean values thereof.

TABLE 1

| | Rate of Occurrence of Horizontal Cracks (%) | | | | | |
|---|---|---|---|---|---|---|
| Times | 1 | 2 | 3 | 4 | 5 | Mean |
| | | Row (CH2) | | | | |
| Conventional | 44 | 25 | 63 | 93 | 78 | 62.2 |
| Embodiment 1 | 2.5 | 7.3 | 5.6 | 11.8 | 20 | 8.8 |
| Embodiment 2 | 0.0 | 1.8 | 1.9 | 2.7 | 3.8 | 2.0 |
| Embodiment 3 | 10.0 | 2.7 | 2.5 | 8.2 | 15.0 | 6.6 |
| | | Column (CH1) | | | | |
| Conventional | 76 | 33 | 14 | 44 | 63 | 40.2 |
| Embodiment 1 | 0.0 | 0.0 | 0.0 | 10.0 | 0.0 | 0.0 |
| Embodiment 2 | 1.3 | 0.0 | 0.0 | 0.0 | 0.0 | 0.2 |
| Embodiment 3 | 0.0 | 0.0 | 0.0 | 0.0 | 2.5 | 0.4 |

According to the foregoing embodiments, since the wafer 2 is stuck to the elastic rubber plate, it is possible to minimize stresses which might be exerted on the wafer 2 due to the movement of the dicing saw, thereby reducing cracks in the cut surface of the wafer 2.

The characteristic feature of these embodiments is that the wafer 2 is stuck to the rubber plate. That is, this invention should by no means be limited to the illustrated mounting methods. For example, in the first embodiment, the wafer 2 may be mounted by sticking the resin adhesive tape 4 at opposite sides to the wafer 2 and the rubber plate 15. Further, the wafer 2 may be stuck directly to the rubber plate. The thickness and number of the rubber plates should not be limited to the illustrated examples.

Still further, the step of stretching the rubber plate may be performed in an alternative method other than using the weight 19 or the rubber roller 6.

Furthermore, in the embodiments, rubber is used as an elastic material. The invention should by no means be limited to rubber. Therefore the elastic material may be the adhesive of the resin adhesive tape 4, namely, the vinyl chloride substrate 4*a* with the gum 20 sprayed thereover.

As mentioned above, according to this invention, since the workpiece of hard material is fixedly mounted using the elastic material, it is possible to minimize stresses which might be exerted due to the movement of the dicing saw. It is also possible to reduce occurrences of cracks in the cut surface of the workpiece.

Therefore it is possible to improve the quality of chips diced from the workpiece and to reduce the rate of faulty chips.

Figure 4:
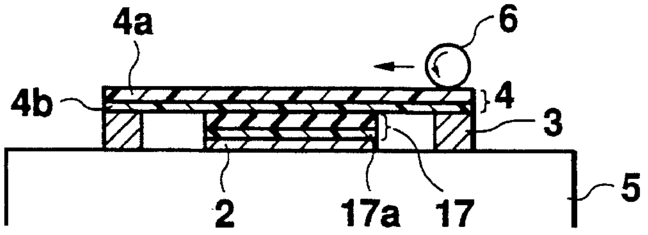
FIG. 4 is a schematic vertical cross-sectional view showing the manner in which a wafer to be diced is mounted according to a fourth embodiment.
Figure 5:
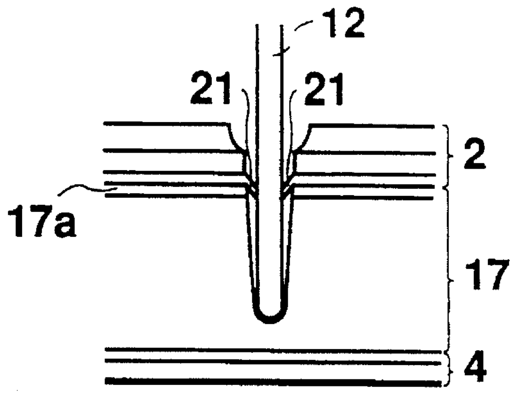
FIG. 5 is a schematic side view showing the manner in which the wafer is cut according to the fourth embodiment.

FIGS. 4 and 5 show a fourth embodiment, in which a wafer 2 as a workpiece of hard material is stuck to an elastic and thick adhesive-attached rubber plate 17. The adhesive-attached rubber plate 17 is cut deeply by the dicing saw so that the dicing blade can be prevented from unintentional displacement. It is therefore possible to minimize stresses which might be exerted on the wafer due to the movement of the dicing saw and also to reduce occurrences of chipping cracks in the cut surface of the wafer 2.

FIG. 4 shows the manner in which the wafer 2 to be diced is mounted according to the fourth embodiment.

The dicing method according to the fourth embodiment is as follows:

Firstly, the resin adhesive tape 4 as the workpiece fixing means is stuck to one surface of a wafer mount frame 3 having an opening. The excessive part of the resin adhesive tape 4 except the part backing the opening of the wafer mount frame 3 is trimmed off, whereupon the adhesive-attached rubber plate 17 is stuck to the resin adhesive tape 4 from the open side of the wafer mount frame 3. The adhesive-attached rubber plate 17 has a thickness of at least 0.5 mm. The same parts are also used in the following embodiments. The wafer 2 is placed on a mount table 5 heated at 80° C., and then the wafer mount frame 3 is placed on the mount table 5 with the resin-adhesive-tape side up over the wafer 2. The adhesive-attached rubber plate 17 and wafer 2 are fixed to each other by a rubber roller 6.

The thus mounted wafer 2 is cut in the direction of CH2 and then in the direction of CH1 as shown in FIG. 9.

During the dicing, a dicing saw 12 bites deeply into the adhesive-attached rubber plate 17; in this embodiment, it bites into the adhesive-attached rubber plate 17 of 16 mm in thickness to a depth of about 300 μm.

As mentioned above, according to this embodiment, by utilizing the elasticity, i.e. the amount of absorption, of the adhesive-attached rubber plate 17, it is possible to minimize stresses which might be exerted on the wafer 2. Since the dicing saw 12 bites deeply into the thick adhesive-attached rubber plate 17, it is possible to prevent the dicing blade from being unintentionally displaced so that occurrences of chipping cracks in the cut surface of the wafer 2 can be reduced.

Figure 6:
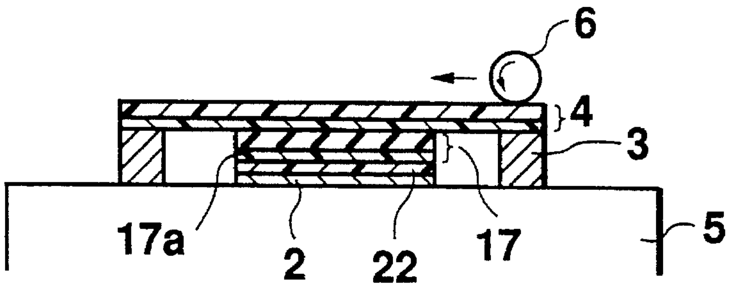
FIG. 6 is a schematic vertical cross-sectional view showing the manner in which a wafer to be diced is mounted according to a fifth embodiment.
Figure 7:
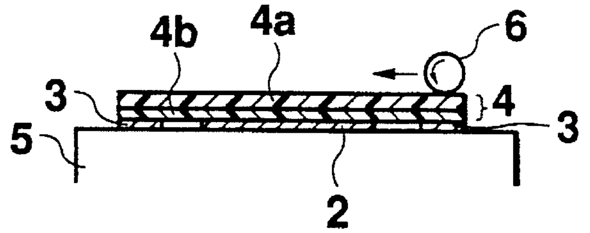
Fig. 7 PRIOR ART
FIG. 7 is a schematic vertical cross-sectional view showing the manner in which a wafer to be diced is mounted according to the conventional art.
Figure 8:
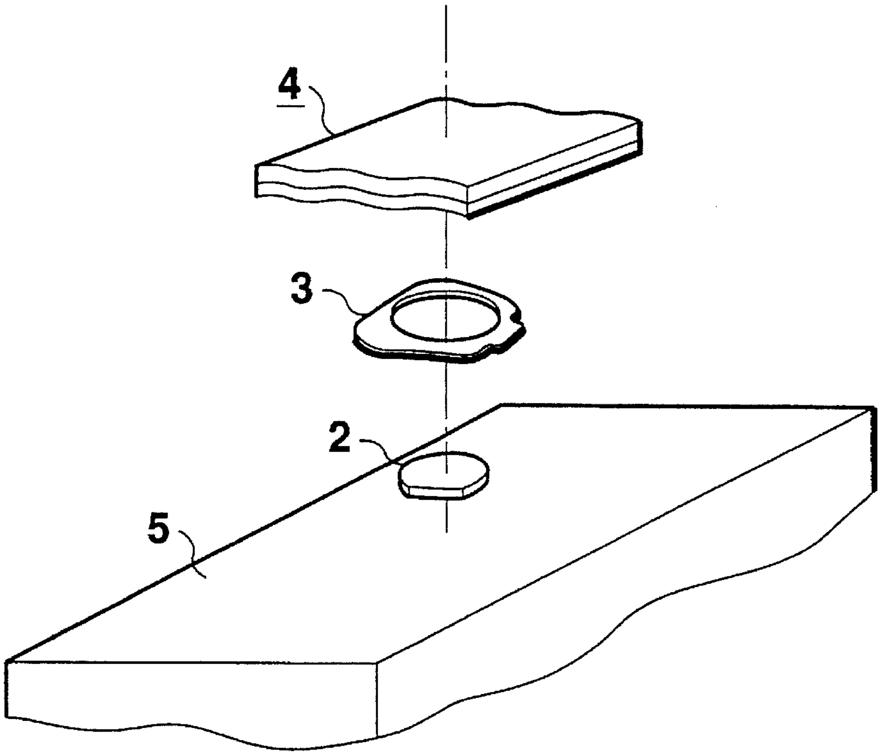
FIG. 8 is a fragmentary exploded perspective view showing the step of mounting a wafer.

FIG. 6 shows a fifth embodiment, in which a wax 22 of hard material is placed between a wafer 2 as a workpiece of hard material and an adhesive-attached rubber plate 17 to be used as an elastic fixing means so that fins can be trimmed off when cutting the wafer 2.

Specifically, in this embodiment, in the step of mounting the wafer 2 of the fourth embodiment, the wax 22 is previously screen-mask printed on the wafer 2, and the wafer 2 is heated at 80° C. for one hour to dry. The wafer 2 is stuck to the adhesive-attached rubber plate 17 with the wax 22 sandwiched therebetween. Thus the wafer 2 is mounted.

The thus mounted wafer 2 is cut in the direction of CH2 and then in the direction of CH1 as shown in FIG. 9.

During the dicing, a dicing saw 12 bites into the adhesive-attached rubber plate 17 to a depth of at least 50 μm; in this embodiment, it bites into the adhesive-attached rubber plate 17 of 16 mm in thickness to a depth of about 300 μm. The fins 21 will be trimmed off as they are held between the dicing saw 12 and the wax 22 during the dicing.

As mentioned above, according to this embodiment, similarly to the fourth embodiment, it is possible to reduce occurrences of chipping cracks in the cut surface of the wafer 2.

Further, since the wax 22 is placed between the wafer 2 and the adhesive-attached rubber plate 17, the fins 21 can be trimmed off. Therefore it is possible to remarkably reduce not only chipping cracks but also occurrences of fins.

Furthermore, since the adhesive-attached rubber plate 17 and the wafer 2 are not directly stuck to each other, it is possible to mechanically separate the chips from the adhesive-attached rubber plate 17 without difficulty.

The required hardness of the wax 22 of hard material is such that the fins 21 will be trimmed off by the dicing saw 12 and the wax 22. In this embodiment, the needle piercing degree of the wax 22 is 2. The term "needle piercing degree" means a value of hardness as measured in terms of the extent to which a needle for cotton thread is pierced perpendicularly into a sample when the needle is forced against the sample by a pressure of 100 g for five seconds. For example, if the needle is pierced into the sample by 0.1 mm, the needle piecing degree is 1.

A sixth embodiment will now be described as follows:

The characteristic feature of this embodiment is that using a soluble material as the hard material, the mounted wafer 2 is soaked in a solvent so that the wafer 2 can be separated from the adhesive-attached rubber plate 17 without difficulty.

Specifically, in this embodiment, the wax 22 of the fifth embodiment as the hard material is coated over the wafer 2. Then the wafer 2 is mounted and diced in the same manner as the fifth embodiment. The diced wafer 2 is soaked in a solvent with adhesive-attached rubber plate 17. In this embodiment, using ↔Triclene as the solvent, the step of washing the chips ultrasonically and the step of separating the chips from the adhesive-attached rubber plate 17 take place simultaneously. The wax 22 to be used in this embodiment has the above-mentioned hardness and is soluble in ↔Triclene. Since the chips can be separated simultaneously with the washing, it is possible to save time.

According to this embodiment, by using the wax 22 soluble in ↔Triclene as the hard material to be used in the fifth embodiment, it is possible to separate the chips from the adhesive-attached rubber plate 17 without difficulty after trimming off the fins.

Further, since the wafer 2 is not directly stuck to the adhesive-attached rubber plate 17, the gum 18*a* of the adhesive-attached rubber plate 17 does not remain on the chips when the wafer 2 is separated from the rubber plate 17.

As mentioned above, according to this embodiment, since the dicing saw bites into the thick adhesive-attached rubber plate 17, it is possible to prevent the dicing blade from unintentional displacement. Therefore it is possible to minimize stresses which might be exerted on the wafer 2 due to the movement of the dicing saw and also to reduce occurrences of chipping cracks in the cut surface of the wafer 2.

Further, since the wax 22 is placed between wafer 2 and the adhesive-attached rubber plate 17, it is possible to trim off fins 21 during dicing. Therefore it is possible to remarkably reduce not only chipping cracks but also occurrences of fins.

Furthermore, since the hard material is soluble, it is possible to separate the chips from the adhesive-attached rubber plate 17 without difficulty.

Table 2 shows the rate of occurrence of horizontal cracks in each of the fourth to sixth embodiments in comparison with the conventional art. These data are values measured when a single wafer 2 was cut in the direction of rows (CH2) five times and then in the direction of columns (CH1) five times and mean values thereof. The rotational speed of spindle of the dicing saw was 60,000 r.p.m.

TABLE 2

| | Rate of Occurrence of Horizontal Cracks (%) | | | | | |
|---|---|---|---|---|---|---|
| Times | 1 | 2 | 3 | 4 | 5 | Mean |
| | | Row (CH2) | | | | |
| Conventional 1 | 44 | 25 | 63 | 93 | 78 | 62.2 |
| Conventional 2 | 62 | 71 | 53 | 61 | 100 | 67.2 |
| Embodiment 4 | 0.0 | 0.0 | 0.0 | 0.0 | 0.0 | 0.0 |
| Embodiment 5 | 0.0 | 0.0 | 0.0 | 0.0 | 0.0 | 0.0 |
| Embodiment 6 | 0.0 | 0.0 | 0.0 | 0.0 | 0.0 | 0.0 |
| | | Column (CH1) | | | | |
| Conventional 1 | 76 | 33 | 14 | 44 | 63 | 40.2 |
| Conventional 2 | 71 | 58 | 47 | 100 | 81. | 72.6 |
| Embodiment 4 | 0.0 | 0.0 | 0.0 | 0.0 | 0.0 | 0.0 |
| Embodiment 5 | 1.3 | 0.0 | 0.0 | 0.0 | 0.0 | 0.0 |
| Embodiment 6 | 0.0 | 0.0 | 0.0 | 0.9 | 2.5 | 0.5 |

Table 3 shows the height of fins developed in the fifth embodiment in comparison with the conventional art.

TABLE 3

| | Height of Metal Fins (μm) | | | | | |
|---|---|---|---|---|---|---|
| Times | 1 | 2 | 3 | 4 | 5 | 6 |
| Conventional | 14 | 16 | 18 | 23 | 22 | 23 |
| Embodiment | 3.0 | 4.0 | 0.3 | 0.5 | 0.5 | 2.3 |
| Times | 7 | 8 | 9 | 10 | Mean | |
| Conventional | 23 | 22 | 19 | 27 | 20.7 | |
| Embodiment | 6.5 | 4.8 | 6.5 | 6.0 | 3.4 | |

According to the foregoing embodiments, it is possible to reduce not only chipping cracks in the cut surface of the wafer 2 but also occurrences of fins.

The substance of the hard material should by no means be limited to the illustrated examples and should have such a hardness that it can be cut by the dicing saw and it can trim off fins. In the foregoing embodiments, ↔Triclene, which is a washing liquid, was used also as a solvent. Alternatively, separating and washing of chips may take place in separate steps. The hard material is determined depending on the property of a solvent to be used; therefore, a variety of combinations may be suggested between solvents and soluble materials.

In the illustrated embodiments, the elastic material is rubber but should by no means be limited to such.

As mentioned above, according to this invention, since the dicing saw cuts deeply into the elastic fixing means, it is possible to minimize stresses which might be exerted on the workpiece of hard material due to the movement of the dicing saw. It is also possible to reduce occurrences of chipping cracks in the cut surface of the workpiece.

Further, since fins are trimmed off by the hard material placed between the workpiece and the elastic fixing means, it is possible to remarkably reduce not only chipping cracks but also occurrences of fins.

Furthermore, by using a soluble hard material, it is possible to separate the workpiece from the elastic fixing means without difficulty. It is also possible to prevent the adhesive of the elastic fixing means from remaining stuck on the workpiece, so that not only deviation of the reliability and electric characteristics but also disconnection and failure can be prevented.

Therefore it is possible to improve the quality of chips diced from the workpiece and to reduce the rate of faulty chips.

A seventh embodiment will now be described, in which a soluble wax 22 is placed between the wafer 2 of hard material and the elastic adhesive-attached rubber plate 17 when the wafer 2 is stuck to the rubber plate 17. After being diced, the wafer 2 stuck to the adhesive-attached rubber plate 17 is soaked in a solvent so that the wax 22 will be dissolved. As a result, it is possible to separate the chips from the adhesive-attached rubber plate 17 without difficulty.

This embodiment is substantially similar to the sixth embodiment except that the wax 22 is not a hard material.

The mounted wafer 2 is cut into chips by a dicing saw, and during this cutting operation, the adhesive-attached rubber plate 17 is not completely cut. The cut wafer 2 together with the adhesive-attached rubber plate 17 is soaked in the solvent. In this embodiment, ↔Triclene as the solvent is used both in the step of washing chips ultrasonically and the step of separating the chips from the adhesive-attached rubber plate 17. The wax 22 is soluble with ↔Triclene. Since the chips can be separated simultaneously with the washing, it is possible to reduce the time needed for carrying out the dicing method.

As mentioned above, according to this invention, by utilizing the elasticity, i.e. the amount of absorption, of the adhesive-attached rubber plate 17, it is possible to separate the chips from the adhesive-attached rubber plate 17 without difficulty, while chipping cracks in the cut surface of the wafer 2 can be reduced. Further, since the wafer 2 is not directly stuck to the adhesive-attached rubber plate 17, the gum 17*a* of the adhesive-attached rubber plate 17 does not remain stuck on the chips.

In this embodiment, ↔Triclene, which is a washing liquid, was used also as a solvent. Alternatively, separating and washing of chips may take place in separate steps; therefore, a variety of combinations may be suggested between solvents and soluble materials.

Further, in the embodiment, the elastic material is rubber but should by no means be limited to such.

Furthermore, in the embodiment, the wax 22 soluble with a solvent is placed between the wafer 2 and the adhesive-attached rubber plate 17. For the same reason, it is also possible to separate (peel) the chips from the adhesive-attached rubber plate 17 even mechanically.

Still further, in the embodiment, dicing takes place on the wafer 2 in the semiconductor industry. This invention should by no means be limited to the manufacturing of semiconductor chips and may be also applied to the dicing process of a workpiece of hard material such as ceramics or glass.

As mentioned above, according to this invention, since a piece of soluble material is placed between the workpiece and the elastic fixing means, it is possible to separate the workpiece from the elastic fixing means without difficulty.

Since the workpiece is not directly stuck to the elastic fixing means, it is possible to prevent the adhesive of the elastic fixing means from remaining stuck on the chips, so that not only deviation of the reliability and electric characteristics but also disconnection and failure can be prevented.

Therefore it is possible to improve the quality of chips diced from the workpiece and to reduce the rate of faulty chips.

What is claimed is:

1. A dicing method comprising the steps of:

(a) fixing a workpiece to an elastic fixing means;

(b) placing a piece of hard material between the workpiece and said elastic fixing means; and (c) locating the workpiece on the elastic fixing means so that the workpiece is disposed in an opening in a workpiece mount frame.

2. A dicing method according to claim 1, wherein the hard material is fusible.

3. A dicing method, comprising the steps of;

(a) fixing a workpiece to an elastic fixing means having a thickness of at least 0.5 mm;

(b) placing a piece of hard material between the workpiece and the elastic fixing means;

(c) attaching the elastic fixing means with a workpiece fixing means, wherein the workpiece fixing means securely is fixed to a workpiece mount frame and the hard material is fixed to the elastic fixing means and the workpiece is fixed to the hard material so that workpiece is disposed in an opening in the workpiece mount fame; and (d) cutting into the workpiece, the hard material, and the elastic fixing means with a dicing saw so as to cut into the elastic fixing means the depth of at least 50 μm.

4. A dicing method according to claim 3, wherein the hard material is fusible.

* * * * *